J. HOFFACKER.
Combined Plow, Harrow, and Seeder.
No. 196,899. Patented Nov. 6, 1877.
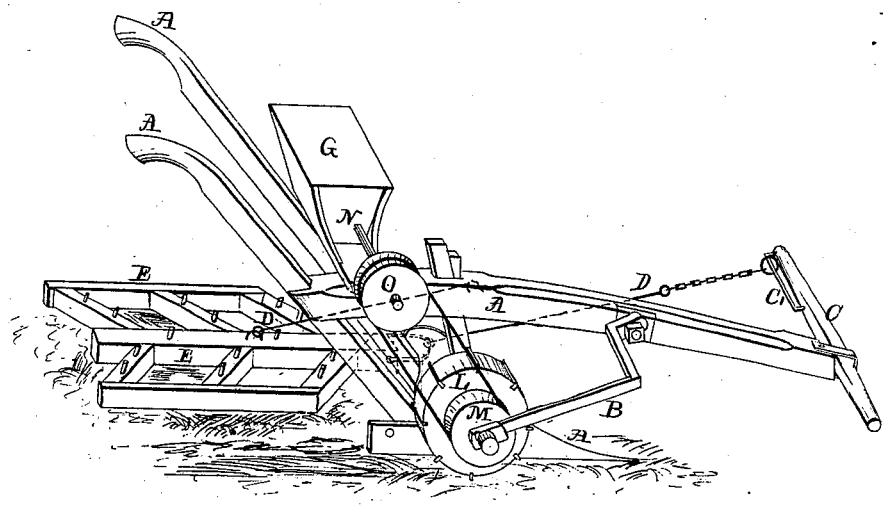
Witnesses:
Inventor:
John Hoffacker.

UNITED STATES PATENT OFFICE.

JOHN HOFFACKER, OF ENGLISH LAKE, ASSIGNOR OF ONE-HALF HIS RIGHT TO LOUIS KNOPF, CHARLES H. KNOPF, AND MICHAEL KNOPF, OF RICHMOND, INDIANA.

IMPROVEMENT IN COMBINED PLOW, HARROW, AND SEEDER.

Specification forming part of Letters Patent No. 196,899, dated November 6, 1877; application filed October 3, 1876.

*To all whom it may concern:*

Be it known that I, JOHN HOFFACKER, of English Lake, Stark county, Indiana, have invented certain new and useful Improvements in Combined Plow, Harrow, and Seeding Device; and I do hereby declare the following to be a full, clear, and exact description of the same, reference being had to the drawing which accompanies this specification, and to the letters of reference marked thereon, which form a part of said specification, in which the figure is a perspective view of my invention.

My invention consists, substantially, in the arrangement and combination of a plow, a harrow, and a seeding device, so comstructed that the breaking of the ground, harrowing it, and sowing the seed may be performed at one and the same time.

It is a well-established fact that the soil is more easily pulverized and made friable when freshly turned up, giving the operations of the harrow greater efficacy, and it is equally well known that seeds germinate best in freshly-prepared soils.

To enable those skilled in the art to make and use my said invention, I will proceed to describe the same.

A represents a plow, of any ordinary style of construction, to which, by means of a bent arm, B, a ground-wheel, L, is attached. The bent arm B is secured to the forward portion of the beam by a bolt or otherwise, upon which it is allowed a vertical motion, and the opposite end of the bent arm B serves as an axle for the ground-wheel L, and by its vertical motion allows the ground-wheel L to rise and fall with the irregularities in the surface of the ground. The ground-wheel L is provided with lugs on its periphery, to insure its regular revolution. Attached to the ground-wheel L is a pulley, M, which revolves with it. G is a seed-box connected rigidly with the beam and handles. A shaft, N, having its bearings in each end of the seed-box, extends outward, provided on the end with a pulley, O, on a parallel line with the pulley M. A band or belt connects these two pulleys, by which motion is communicated to the seeding device, which may be of any suitable kind in the seeding-box G.

E represents a harrow, of any suitable form or size, which is attached to the furrow side of the plow by means of a chain, D, or other convenient device, by means of a cross-bar, C, connected to the end of the plow-beam. The harrow is held in position laterally by means of a brace-rod, D, one end of which is secured to the plow, and the other end to the harrow. The cross-bar C serves as an equalizing double-tree, being pivoted at one side from its center, and the longer arm projecting on the side of the beam to which the harrow is hitched, and having loop C', to which the chain is attached, allowing a lateral movement of the chain. These parts are so arranged because the draft is heavier on the harrow side than on the other, as will be readily seen.

I do not claim anything new in the construction of either the plow, the harrow, or the seed-box but the combination and the arrangement of the three in such a manner as that plowing, harrowing, and seed-sowing can be done at one and the same time.

After having thus fully described my said invention, what I claim as new, and desire to secure by Letters Patent, is—

1. The combination of plow A, ground-wheel L, connected belt-pulleys M and O, for operating seed-dropper G, harrow E, hitched upon the furrow side of the plow-beam, chain D, and equalizing double-tree C.

2. The equalizing double-tree C, having elongated loop C', and harrow-chain D, connected to said loop by a sliding ring, as shown.

JOHN HOFFACKER.

Witnesses:
JOHN B. HARTKORN,
WM. T. DENNIS.